(12) United States Patent
Wieder

(10) Patent No.: US 6,981,858 B2
(45) Date of Patent: Jan. 3, 2006

(54) MOLD INTERLOCK

(76) Inventor: Klaus A. Wieder, W3877 Scheel La., Helenville, WI (US) 53137

( * ) Notice: Subject to any disclaimer, the term of this patent is extended or adjusted under 35 U.S.C. 154(b) by 0 days.

(21) Appl. No.: 10/431,355

(22) Filed: May 6, 2003

(65) Prior Publication Data

US 2003/0203062 A1  Oct. 30, 2003

Related U.S. Application Data

(63) Continuation of application No. 09/900,392, filed on Jul. 6, 2001, now Pat. No. 6,558,145.

(60) Provisional application No. 60/216,274, filed on Jul. 6, 2000.

(51) Int. Cl.
*B29C 33/20* (2006.01)

(52) U.S. Cl. .................. 425/107; 425/190; 425/192 R; 425/451.9; 425/595

(58) Field of Classification Search ................ 425/107, 425/190, 192 R, 451.9, 472, 595
See application file for complete search history.

(56) References Cited

U.S. PATENT DOCUMENTS

| 1,000,470 | A |   | 8/1911  | Widmann |
|-----------|---|---|---------|---------|
| 1,717,109 | A | * | 6/1929  | Last ............................ 164/29 |
| 2,959,814 | A |   | 11/1960 | Budd |
| 3,703,762 | A |   | 11/1972 | Lind |
| 3,920,364 | A |   | 11/1975 | Cadogen-Rawlinson et al |
| 4,000,561 | A |   | 1/1977  | Wieder et al. |
| 4,315,727 | A |   | 2/1982  | Black |
| 4,374,636 | A | * | 2/1983  | Holmes ....................... 425/589 |
| 4,420,446 | A |   | 12/1983 | Wieder et al. |
| 4,487,564 | A |   | 12/1984 | Von Holdt |
| 4,502,660 | A | * | 3/1985  | Luther et al. ............... 425/577 |
| 4,662,426 | A | * | 5/1987  | Scherer ....................... 164/412 |
| 4,881,891 | A |   | 11/1989 | Luther |
| 5,044,921 | A |   | 9/1991  | Micelli et al. |
| 5,332,384 | A | * | 7/1994  | Abramat ................... 425/450.1 |
| 5,397,231 | A |   | 3/1995  | Bald |
| 5,421,544 | A |   | 6/1995  | Roop |
| 5,494,435 | A |   | 2/1996  | Vandenberg |
| 5,762,977 | A |   | 6/1998  | Boskovic |
| 5,769,554 | A |   | 6/1998  | Slocum |
| 5,776,517 | A |   | 7/1998  | Ciccone et al. |
| 5,879,726 | A |   | 3/1999  | Hsing |
| 5,882,695 | A | * | 3/1999  | Starkey ....................... 425/190 |

(Continued)

FOREIGN PATENT DOCUMENTS

GB        2158839        11/1985

(Continued)

OTHER PUBLICATIONS

Progressive Components Side Lock Test Report dated Apr. 17, 2000.

(Continued)

*Primary Examiner*—James P. Mackey
(74) *Attorney, Agent, or Firm*—Boyle, Fredrickson, Newholm, Stein & Gratz, S.C.

(57) ABSTRACT

A mold interlocking device that includes a first portion attached to a mold half that has a head with a channel and an insert therein that is received in a pocket of a receptacle of a second portion that is attached to another mold half. In one embodiment, the head comprises sidewalls each with channels that receive a replaceable insert therein. Preferred inserts include rollers, plates, plates with lubricating plugs, and plates comprised of layers. In one embodiment, each sidewall of the head has a tapered section disposed between a mounting base and a straight section and each pocket is defined by a complementarily contoured sidewall. In another embodiment, each head sidewall further includes a second tapered section adjacent the free end of the head.

40 Claims, 13 Drawing Sheets

U.S. PATENT DOCUMENTS

| | | |
|---|---|---|
| 6,120,279 A | 9/2000 | Vovan |
| 6,287,104 B1 | 9/2001 | Hehl |
| 6,308,929 B1 | 10/2001 | Wieder |
| 6,325,614 B1 | 12/2001 | DiSimone |
| 6,367,765 B1 | 4/2002 | Wieder |
| 6,431,852 B1 | 8/2002 | Vandenberg |
| 6,558,145 B2 * | 5/2003 | Wieder ........................ 425/107 |
| 2002/0106420 A1 | 8/2002 | Vandenberg |
| 2002/0146482 A1 | 10/2002 | Rick |

FOREIGN PATENT DOCUMENTS

| | | | |
|---|---|---|---|
| JP | 62-140812 | * | 6/1987 |
| JP | 62-148227 | * | 7/1987 |
| JP | 2107409 | | 4/1990 |
| JP | 6328518 | | 11/1994 |
| JP | 8072111 | | 3/1996 |
| JP | 8281746 | | 10/1996 |
| JP | 10180767 | | 7/1998 |
| JP | 10193366 | | 7/1998 |
| JP | 11000921 | | 1/1999 |
| JP | 11226962 | | 8/1999 |
| JP | 11300754 | | 11/1999 |
| JP | 11314228 | | 11/1999 |
| JP | 2000218685 | | 8/2000 |

OTHER PUBLICATIONS

Progressive Components brochure 99B/1 undated.
Progressive Report, Feb. 1999.
Kasahara, M., "Sorting out oilless bearings", Machine Design, Sep. 25, 1986, pp. 58-61, 64.
Procomps Progressive Components post card, undated.
Progressive Components side lock data sheet, undated.
D-M-E straight side interlock data sheet, undated.
D-M-E round tapered interlock data sheet, undated.
D-M-E rectangular tapered interlock brochure, undated.
D-M-E self-lubricating wear ways data sheet, Sep. 1998.
Pages from SelfLube, Inc. website and online catalog, Apr. 2001.

* cited by examiner

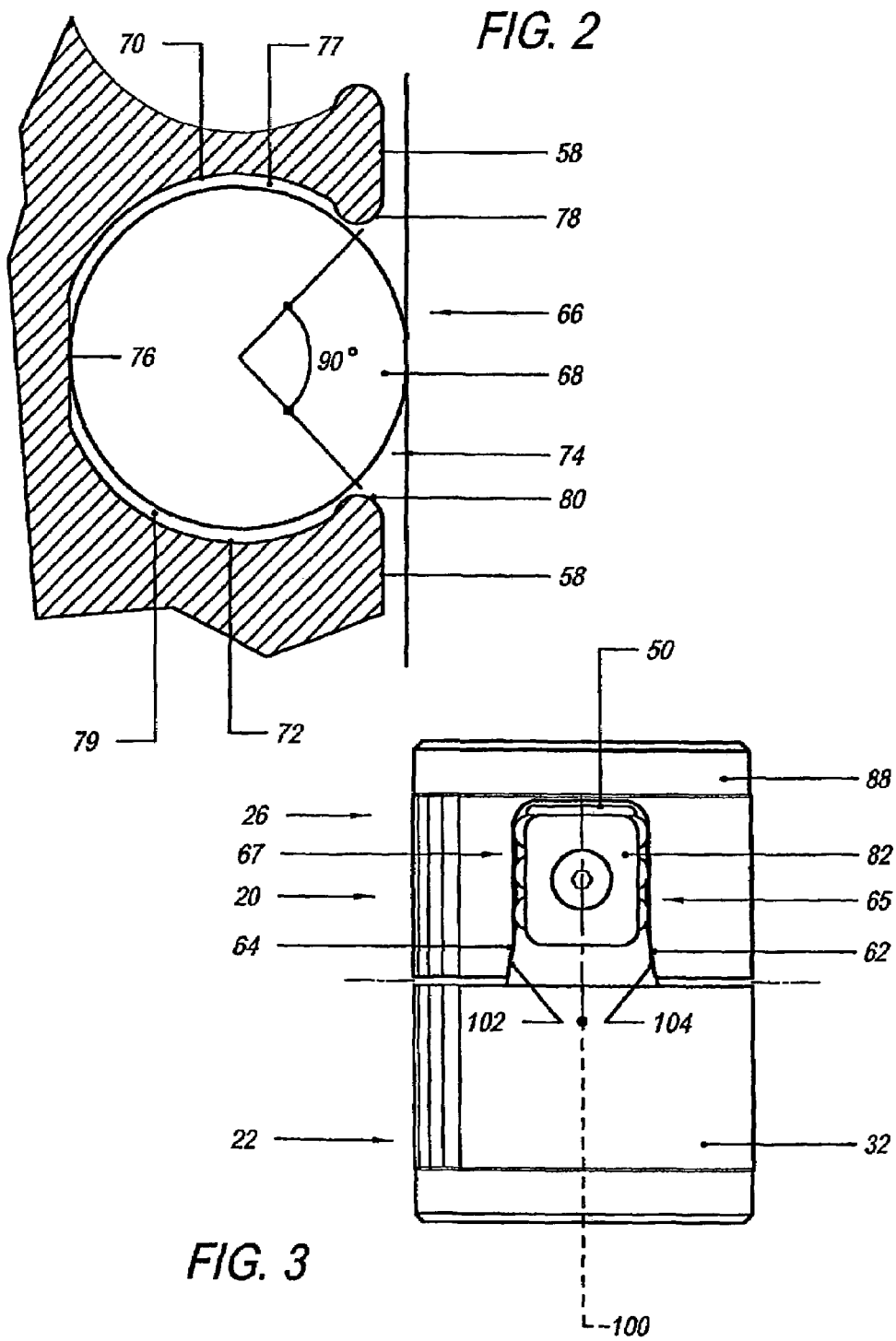

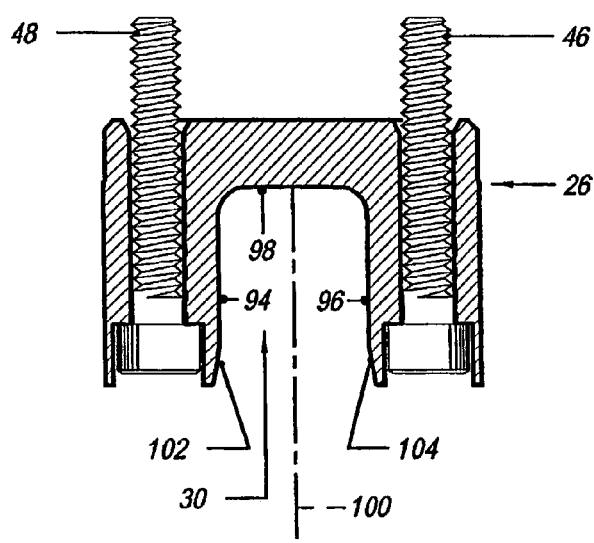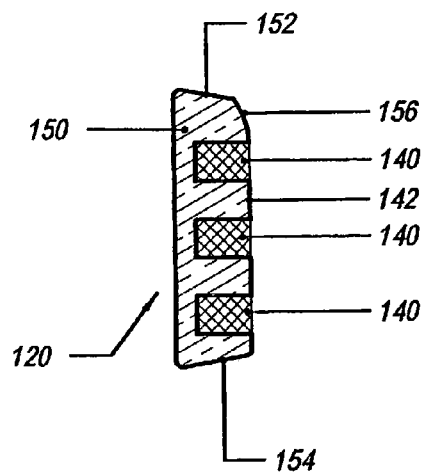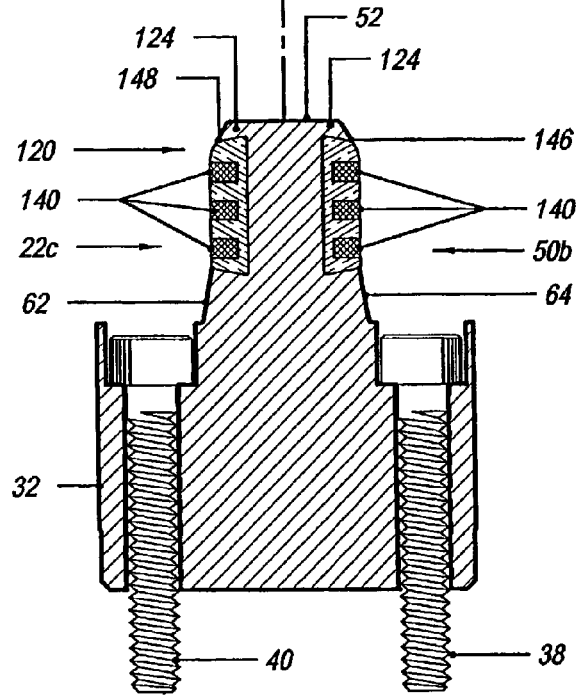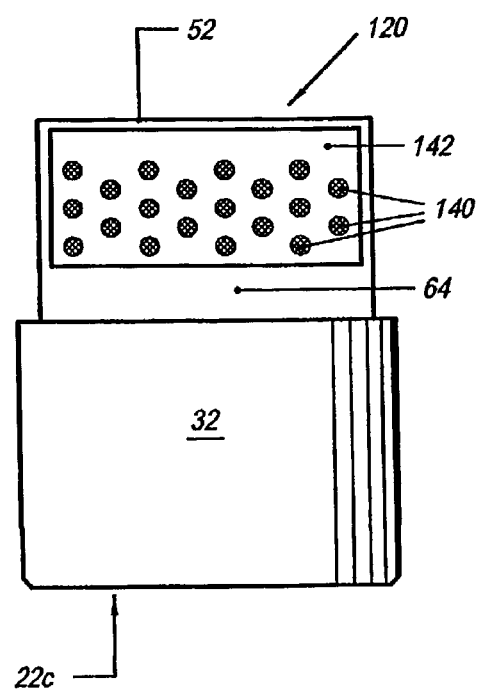

MOLD INTERLOCK

CROSS REFERENCE TO RELATED APPLICATION

This application is a continuation of U.S. patent application Ser. No. 09/900,392, filed Jul. 6, 2001, now U.S. Pat. No. 6,558,145, and claims priority under 35 U.S.C. §119(e) in U.S. Provisional Patent Application No. 60/216,274, filed Jul. 6, 2000, the entirety of both of which are incorporated by reference herein.

FIELD OF THE INVENTION

The present invention is directed to an apparatus for helping one mold half mate with another mold half, and more particularly to a mold interlock or locking device.

DESCRIPTION OF THE RELATED ART

Molds, such as those used in injection molding, typically include two mold halves that can each be equipped with a mold cavity used to make some part. During molding, relative movement between the mold halves bring the two halves together. A moldable material, such as a plastic, a resin, or the like, is injected into each cavity. After the moldable material has had a certain amount of time to set, the mold halves are separated and the molded part is ejected.

This process typically does not take very long. For example, in some molding application, the complete cycle time to make a molded component can be as little as a couple of seconds.

Molds are equipped with mold interlocks that help ensure accurate alignment and guidance of the mold halves during mold setup and later when they are repeatedly being brought together during operation. Such locks are also intended to help ensure guidance between mold cores and stripper inserts, when such mold components are used.

Typically, each mold has four such interlocks with an interlock located along each side of the mold. Each interlock includes a head, or male portion, that is attached to one mold half and a receptacle, or female portion, that is attached to the other mold half. When the mold halves come together, the head of each interlock is received in its respective receptacle helping to ensure accurate mating of the mold halves.

During mold setup, interlocks are attached to the mold halves at parting line and one mold half is brought into mating contact with the other mold half. When mated, the head of each interlock is received in its respective receptacle. Various components of the mold are thereafter adjusted to locate the mated mold halves relative to each other. This helps ensure smooth, fast and accurate operation of the mold during molding operation.

During molding operation, as the mold halves are brought together, the head of each interlock is received in the receptacle. The receptacle has one or more sidewalls that guide movement of the head as it enters and moves into the receptacle. As the head enters and moves into the receptacle it helps guide the mold halves together to ensure that that they accurately mate with each other. By helping to ensure accurate mating, mold interlocks help correct or compensate for slight misalignment between mold halves. This also helps ensure that mold cavities accurately overlie each other during molding and that the mold cavity shut-offs properly align.

One very common type of mold interlock is a side lock. A side lock has a head that extends outwardly from a horizontal mounting base that is of square or rectangular cross section. The head is defined by straight sidewalls that are typically generally perpendicular to the base. During operation, the head is received in a receptacle that is defined by a pair of straight sidewalls that are generally parallel to the straight sidewalls of the head.

Side locks are simple to use and install. They typically designed with an angular clearance of zero degrees and a dimensional clearance of between 0.0002 and 0.0004 inch between the head and the receptacle. They also allow for thermal expansion of the mold halves when properly installed. Zero clearance locking fitting typically is not required.

They are not without drawbacks. Their relatively narrow clearance means that they can bind if not opened in parallel, which can occur if there is some misalignment. These types of locks give little protection to smaller angle shut-offs, which can lead to shut-off misalignment or clashing. They usually need lubrication, which means that they cannot be used in certain medical and food component molding applications where lubricants typically cannot be used. Even when lubricated, metal to metal contact between the head and receptacle often result in excessive wear because any lubricant is often wiped during mold operation.

Another common type of lock is a rectangular tapered interlock. They are similar in construction to a side lock, except that its head is longer and its sidewalls tapered. While its sidewalls that define its head are straight, each sidewall has a taper angle of about 10° from perpendicular. Each sidewall of the receptacle in which the head is received is complementarily tapered. This type of lock is machined into both cavity mold halves at parting line and adjusted to zero clearance by grinding the overall height of the head.

This type of mold interlock is easy to install, provides a larger contact area, and accommodates greater mold misalignment than does a side lock. However, it too suffers from many of the drawbacks of side locks. For example, its tapered straight sidewall construction provides little protection to relatively small angle shut-offs. As a result, shut-off misalignment or clashing can undesirably occur. Lubrication can also be a problem. This can limit its use and lead to premature replacement due to excessive wear.

A still further type of mold interlock is a tapered round interlock. It has a head defined by a tapered, conical sidewall that is received in a complementary receptacle. Its application is limited because it does not accommodate thermal expansion and provide little protection for smaller angle shut-offs.

What is needed is a mold interlock that does not suffer from at least one or more of the aforementioned drawbacks. What is also needed is a mold interlock that is more economical to use.

SUMMARY OF THE INVENTION

The present invention is directed to a mold interlocking device that includes one portion that is attached to one mold half that has a head that is received in a pocket in a receptacle of another portion that is attached to the other mold half. In one preferred embodiment, the head has a sidewall with at least one channel in it for receiving an insert that facilitates insertion of the head into the pocket when one mold half is being brought toward the other mold half. In another preferred embodiment, the head includes a pair of spaced apart and generally parallel sidewalls that has a tapered section disposed between a straight section and a mounting base from which the head extends. The pocket is defined by sidewalls of complementary contour. In a still further preferred embodiment, the head includes a second tapered section that is located between its free end and the straight section.

In one preferred mold interlock embodiment, the head has a pair of spaced apart sidewalls that each have a plurality of channels therein. The head extends outwardly from the mounting base and the base is removably mounted to a mold half. An insert is received in each channel. Preferably, a portion of each insert extends outwardly beyond the sidewall in which it is disposed so that it can make contact with a sidewall of the pocket during insertion of the head into the pocket. In a preferred insert embodiment, each insert comprises a roller that is capable of rotation relative to the head. In one preferred roller embodiment, each roller comprises a needle bearing. In one preferred embodiment, each sidewall has three channels with a roller disposed in each channel.

Each channel is comprised of a pair of generally parallel lips that curl slightly around a roller received in the channel to retain the roller. Preferably, the channel and the lips are constructed such that at least about one-quarter of the roller surface is exposed. Each lip is constructed to provide a slight amount of clearance to facilitate rotation as well as to permit lubricant on a roller to pass between it and the roller. Additional clearance between the channel and the roller interiorly of the lip so as to provide a reservoir for lubricant. This reservoir helps lubricate and thereby increase the life of the roller.

The head includes a pair of spaced apart endwalls that bracket the sidewalls. Each channel preferably has an entrance in at least one of the sidewalls to permit insertion of a roller therein. A stop prevents withdrawal of the roller once it has been inserted. A preferred stop embodiment is a plate that is removably attached to the sidewall. If desired, the channel can extend through both endwalls and a pair of such stop plates can be used to retain rollers in their respective channels.

The channels are located in a straight section of each sidewall, which preferably are generally parallel to each other. Each sidewall preferably further includes an tapered section disposed between its straight section and the mounting base. The tapered section is outwardly tapered such that the head is wider adjacent the mounting base than adjacent its free end. When the head is inserted into the pocket, each tapered section preferably bears against a portion of a pocket sidewall to help ensure that a positive interlock is achieved.

The receptacle includes a pair of spaced apart upstanding arms that extend outwardly from a mounting base that mounts to a mold half. The receptacle includes a bottom wall and a pair of spaced apart and generally parallel sidewalls that are spaced apart so as to define a pocket therebetween that receives the head when one mold half is being brought toward the other mold half. The sidewalls are spaced apart so as to provide sufficient clearance for entry of the head while still accommodating some mold misalignment. In one preferred embodiment, the clearance between the head and pocket sidewall is at least 0.0005 inch to accommodate greater misalignment than a side lock.

In one preferred embodiment, each pocket sidewall has a tapered section adjacent the pocket mouth. Preferably, each tapered section tapers outwardly such that the width of the pocket adjacent its mouth is greater than the width of the pocket adjacent the bottom wall. Each tapered sidewall section of the receptacle bears against a corresponding tapered sidewall section of the head when the head is nearly completely inserted into the pocket to help correct misalignment. Preferably, when the head is inserted into the pocket, the tapered section of each head sidewall bears against a corresponding pocket sidewall such that there is zero clearance therebetween to help correct misalignment.

In a second mold interlock embodiment, the insert comprises a rectangular plate and each head sidewall preferably is equipped with only a single channel. To help prevent movement of the plate during mold operation, the lips of the channel converge slightly toward each other such that the channel is narrower on one end. The plate is of complementary construction such that it abuts against the lips during insertion and there is engagement between the lips and the plate that prevents lateral plate movement.

The plate is constructed so as to be replaceable, such as when wear warrants. In one preferred embodiment, the plate is intended to be sacrificial. In one preferred plate embodiment, the plate is comprised of a metal and includes spaced apart plugs embedded therein. Each plug preferably is comprised of a friction reducing material that can be a lubricant. For example, in one preferred plug embodiment, each plug is comprised of graphite. In another plate embodiment, the plate is comprised of a plurality of layers and can be of laminate construction. In one preferred plate embodiment, one of the layers comprises a friction reducing material that can be a lubricant.

In still another mold interlock embodiment, each head sidewall includes a second tapered section that is disposed between its free end and the straight sidewall section. The second tapered section is inwardly tapered such that the width of the head adjacent its free end is narrower than where the head sidewalls are straight. The second tapered section provides additional clearance that accommodates greater misalignment.

Objects, features and advantages of the invention include one or more of the following: to provide a mold interlock having improved wear resistance; to provide a mold interlock that tolerates mold misalignment while rapidly correcting the misalignment and providing protection to relatively small angle shut-offs; to provide a mold interlock that has replaceable wear surfaces for reduced operating costs; to provide a mold interlock that can be used in applications where liquid lubricants cannot be used; to provide a mold interlock that includes a reservoir for liquid lubricant that would ordinarily be wiped free of the interlock during mold operation; to provide a mold interlock that is particularly well suited for use in plastic injection molding applications; to provide a mold interlock that achieves one or more of the benefits of side locks, tapered rectangular interlocks and round interlocks without one or more of their disadvantages; to provide a mold interlock that accommodates greater misalignment while still achieving zero clearance when completely seated; and to provide a mold interlock that is of simple, durable, robust, tough and economical construction and which is simple to install and use.

BRIEF DESCRIPTION OF THE DRAWINGS

Preferred exemplary embodiments of the invention are illustrated in the accompanying drawings in which like reference numerals represent like parts throughout and in which:

FIG. 2 is an enlarged fragmentary cross sectional view of a part of the mold interlocking device of FIG. 1 depicting a roller insert that facilitates mold interlocking and a channel in which the roller is received;

FIG. 3 is an end view of a mold with its two halves mated and the mold interlocking device in a closed position engaging one mold half;

FIG. 13 is a cross sectional view of the head of the mold interlock of FIG. 12;

FIG. 14 is a cross sectional view of the receptacle of the mold interlock of FIG. 12;

FIG. 15 is an enlarged cross sectional view of the insert of the mold interlock of FIG. 12;

FIG. 16 is a side elevational view of the mold interlock of FIG. 12;

DETAILED DESCRIPTION OF ONE OR MORE PREFERRED EMBODIMENTS

Figure 1:
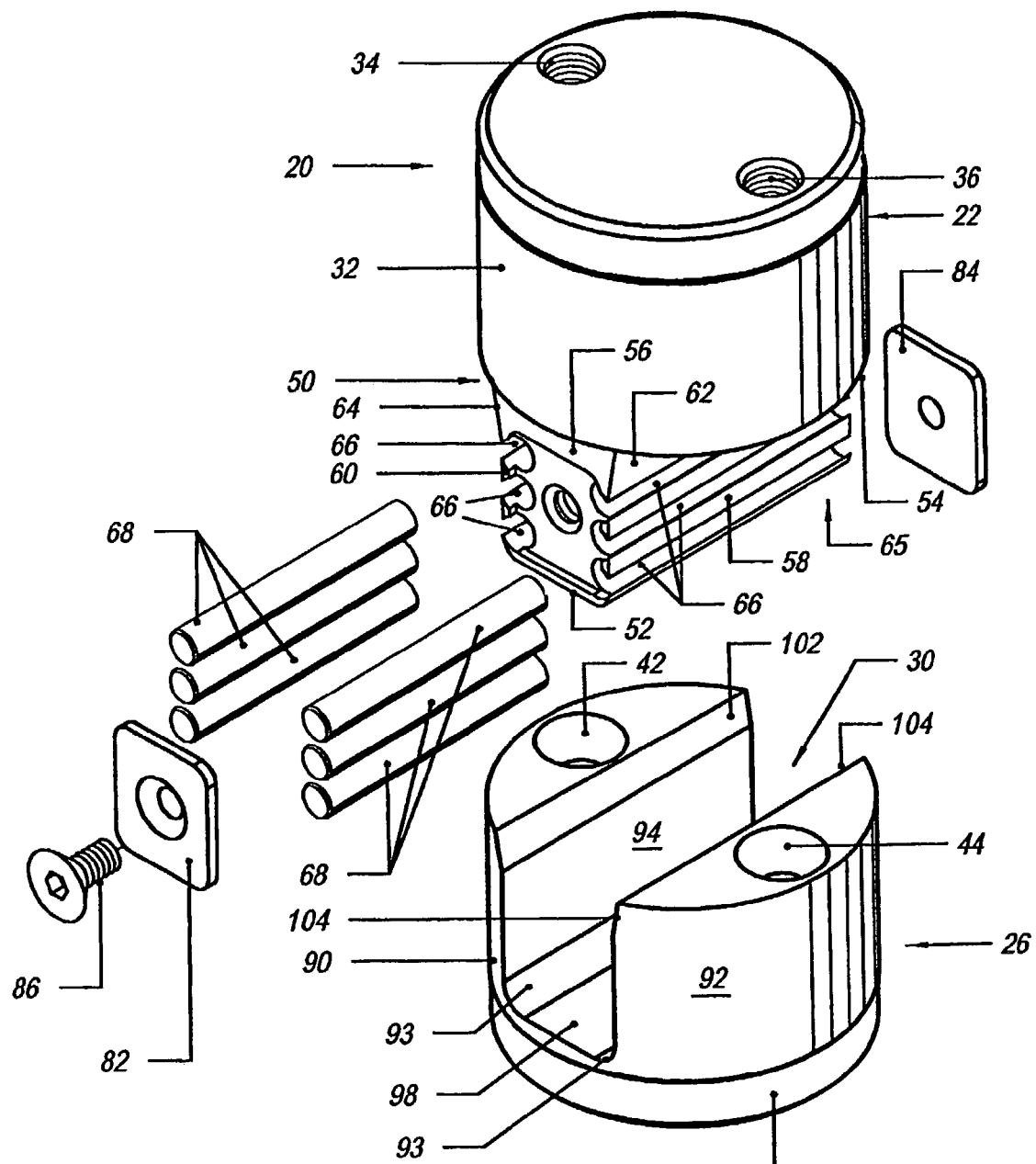
FIG. 1 is an exploded perspective view of a first preferred embodiment of a mold interlocking device of this invention.

FIGS. 1–5 depicts a mold interlocking device 20 that includes a locking device 22 that is carried by one mold half 24 and which registers with a receptacle or receiver 26 that is carried by another mold half 28 during mold operation. The receiver 26 has a pocket 30 that receives at least a portion of device 22 when both mold halves are closed.

Figure 4:
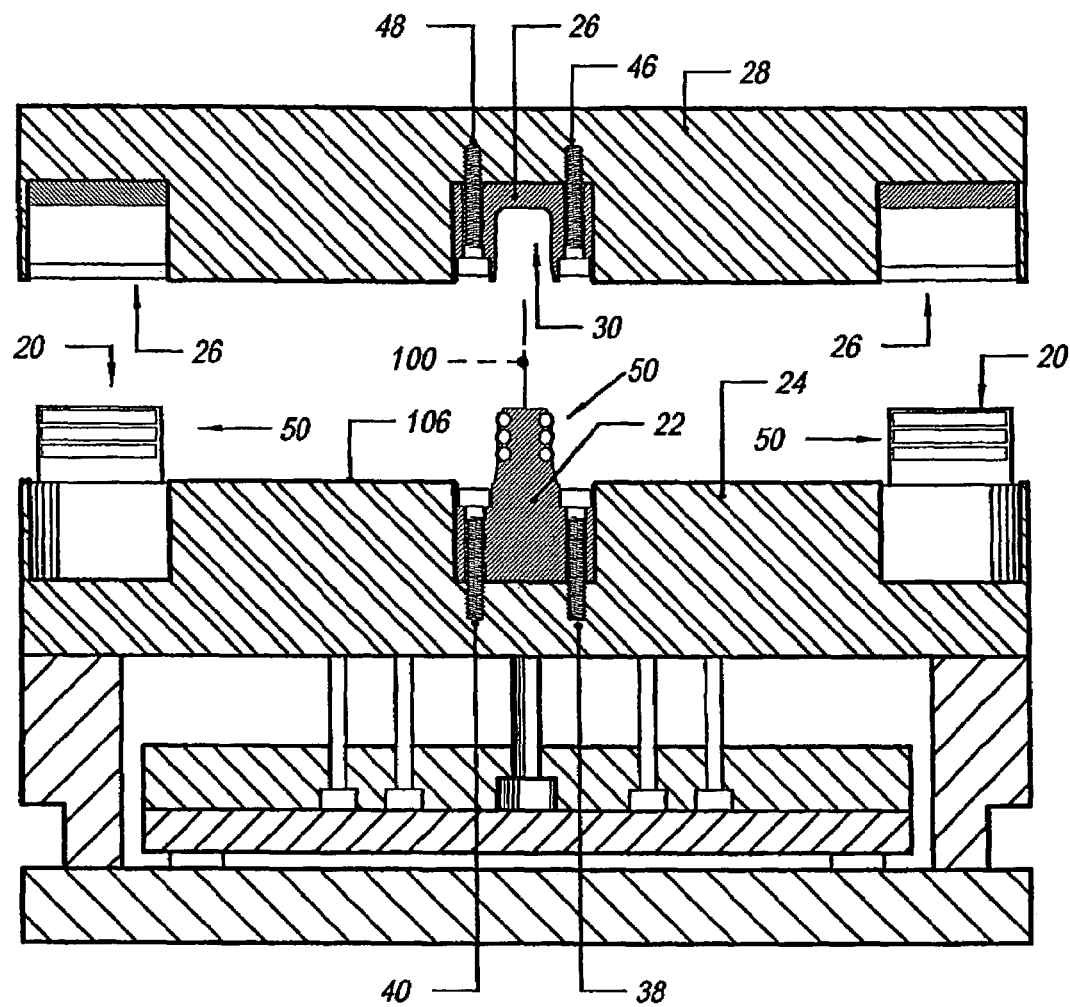
FIG. 4 is a cross sectional view of the mold with its halves separated depicting a plurality of the mold interlocking devices.

The locking device 22 has a base 32 that is generally cylindrical in the preferred embodiment shown in FIGS. 1–5. The base 32 includes some means for attaching the device 22 to one of the mold halves. For example, the base 32 has a pair of spaced apart bores 34, 36 that can each be threaded for receiving a threaded fastener, such as a bolt or screw. Referring to FIG. 4, there is a pair of bolts 38, 40 that attach the device 22 to mold half. Preferably, the base 32 is disposed in a recess formed in the mold half to which it is attached.

The receiver 26 also includes some means for attaching it to another one of the mold halves. For example, as is shown in FIG. 1, the receiver 26 has a pair of spaced apart bores 42, 44 that can each be threaded. As is shown in FIG. 4, a pair of bolts 46, 48 are used to attach the receiver 26 to mold half. Preferably, the receiver 26 is disposed in a recess formed in the mold half to which it is attached.

The locking device 22 has a head 50 that is disposed in the pocket 30 of the receiver 26 when the mold halves 24, 28 are brought together. The head 50 has a generally rectangular cross sectional shape and includes a top wall 52, a pair of end walls 54, 56, and a pair of sidewalls 58, 60. The sidewalls 58, 60 each have a tapered section 62, 64, that tapers inwardly from adjacent the base 32 slightly toward each other toward the front wall 52, such as is depicted more clearly in FIG. 4. As a result, the width of the tapered section 62, 64 of the head 50 is greater than the width of the head 50 adjacent its free end 52.

As is shown more clearly in FIG. 3, each tapered section 62, 64 is disposed between the base 32 and a straight section 65, 67 in which inserts in the form of pins or rollers 68 are disposed. In one preferred embodiment, the straight sections 65, 67 are parallel and disposed parallel to a longitudinal axis 100 of the head 50.

Where the head 50 has a tapered sidewall construction, it preferably also helps more accurately locate one mold half relative to the other mold half when the mold halves are closed. The tapered sidewall construction preferably also serves as a stop that helps limit movement of one mold half toward the other mold half when the mold is closed, such as during molding. In a preferred embodiment, each tapered section 62, 64 is disposed at an angle of between 7° and 10° relative to its corresponding straight sidewall section. In another preferred embodiment, each tapered section is disposed at an angle of between 7° and 10° relative to longitudinal axis 100.

In another preferred embodiment, where additional clearance between the head 50 and receiver 36 during entry of the head 50 into the receiver 26 is desired, the head 50 can have a somewhat frustoconical cross sectional shape such that it is slightly narrower adjacent its free end.

At least one sidewall, preferably each sidewall 58, 60, has a plurality of spaced apart grooves or channels 66 that preferably are parallel and disposed in its straight sidewall section. In the preferred embodiment depicted in FIGS. 1–4, each channel 66 preferably runs the full length or substantially the full transverse length of the sidewall, preferably from one end wall 56 to the other end wall 54. Each channel 66 receives a pin or roller 68 that preferably has a generally cylindrical shape and can be tubular.

In the preferred embodiment depicted in FIGS. 1–4, each channel 66 preferably comprises an elongate raceway, preferably a bearing raceway. An example of one preferred roller 68 is a roller bearing, such as a roller bearing needle or tapered roller bearing that can be comprised of a metal, such as steel, or a non-metal material, such as a composite or a ceramic material.

Referring to FIG. 2, the cross sectional shape of each channel 66 preferably is generally complementary to that of the roller 68 that will be received in it. In a preferred channel embodiment, the channel 66 has a pair of arcuate sidewalls 70, 72 that form a mouth 74 through which the roller 68 is exposed. The rear of the channel also includes a flat 76 and each sidewall edge has a lip 78, 80 that narrows the clearance between it and the roller 68 received in the channel 66 from about 0.005 inches to virtually no clearance at all. In the preferred embodiment shown in FIG. 4, there is a clearance preferably of no more than 0.001 inches between each lip 78, 80 and the roller 68 and preferably there is no clearance between the flat 76 and the roller 68. If desired, each lip 78, 80 can be rounded as shown in FIG. 2. The flat 76 helps maintain location of the roller 68 and can be comprised of a lubricant that gets distributed on the roller 68 during molding operation.

The channel configuration in FIG. 2 is advantageous because it helps minimize friction, thereby extending the useful life of the head 50. Where lubrication is used, the relatively small clearance between each lip 78 and roller 68 is sized to permit flow of lubricant into a reservoir 77 created by the larger clearance that is disposed interiorly. As indicated above, the preferred clearance between lip 78 and roller 68 is no more than 0.001 inch. Where equipped with a flat 76, a second reservoir 79 is created. As a result of the creation of one or more reservoirs, lubrication placed on the head 50 or in the pocket 30 of the receiver 26 that ordinarily would be wiped away during operation, accumulates in at least one of the reservoirs 77, 79. Rotation of the roller 68 along with the clearance between it and lip 78 permits a film of lubricant to coat at least part of the roller 68, thereby reducing friction and wear. Lubricant also needs to be added less frequently because it is retained longer. Preferably, where lubricant is added, it is added no more frequently than every 25,000 cycles of the mold opening and closing.

Each channel 66 preferably is constructed so that it encompasses or encircles greater than 180° around a roller 68 received in the channel 66 so that the roller 68 is retained in the channel 66 and will not pass out the mouth 74. Each channel 66 is also constructed so that a portion of the roller 68 extends outwardly beyond the sidewall 58 so that it, not the sidewall 58, comes into contact with a portion of the receiver 26 when the mold halves 24, 28 are closed. In the preferred embodiment depicted in FIG. 2, the channel 66 encompasses or encircles as much as about 270° of the roller 68.

As a result, preferably no more than about 90° of each roller 68 is exposed in a preferred channel construction. This arrangement also permits roller 68 contact with a sidewall surface of the receiver 26 during insertion without any other part of the head 50 contacting the receiver 26. This helps ensure that contact between the head 50 and receiver 26 rotates at least one roller 68, which reduces friction because roller rotation creates a dynamic friction condition instead of a static friction condition that normally results during operation of conventional mold interlocks.

Each channel 66 preferably extends to at least one of the endwalls 54, 56 such that there is an opening therein for permitting roller insertion. Once inserted, all of the rollers 68 are kept axially captive in its respective channel 66 by at least one end plate 82 that is removably attached to an end wall of the head 50 by a fastener, such as a screw, a bolt, or another type of fastener. In the preferred embodiment shown in FIGS. 1–4, there is a pair of such end plates 82, 84 each of which is attached by a screw 86.

Each roller 68 can rotate relative to the rest of the locking device 22 to facilitate docking or seating of the head 50 of the locking device 22 with the receiver 26. If desired, each roller 68 and/or each channel 66 can be lubricated to help reduce wear. If desired, each roller 68 and/or each channel 66 can be impregnated with lubricant, be made of a self-lubricating material and/or be made of a material that has a low coefficient of friction. In a preferred embodiment, liquid lubricant is added to the head 50 and/or the pocket 30 of the receiver 26 no more frequently than every 25,000 mold cycles.

The receiver 26 includes a base 88 from which a pair of arms 90, 92 extend, between which is disposed the locking device head-receiving pocket 30. There preferably is a radiused portion 93, 95 between each arm 90, 92 and the base 88 to prevent cracking during operation. The pocket 30 is defined by a pair of opposed sidewalls 94, 96 and a bottom wall 98. In the preferred embodiment depicted in FIGS. 1, 3 and 4, the sidewalls 94, 96 preferably are substantially parallel and the pocket 30 comprises a slot in which the head 50 is received when docked or seated. Preferably, the sidewalls 94, 96 are straight and generally parallel relative to a longitudinal axis 100 (FIG. 4) of the locking device 50.

In a preferred embodiment, a section 102, 104 of each sidewall 94, 96 can taper slightly outwardly away from each other, such as is depicted in FIG. 4, to help facilitate entry of the head 50 into the pocket 30. Each tapered section 102, 104 preferably is tapered at an angle that avoids lockup of the head 50 during insertion. In a preferred embodiment each tapered section 102, 104 is tapered at an angle of between 7° and 10° relative to the straight section of its corresponding sidewall 94, 96. In another preferred embodiment, each tapered section 102, 104 is tapered at an angle of between 7° and 10° relative to horizontal axis 100. Preferably, the taper angle of each tapered sidewall section 102, 104 is substantially the same as the taper angle of each tapered sidewall section 62, 64 of the head 50. As a result, the tapered sections 62, 64, 102, 104 bear against each other when the head 50 is completely seated in the pocket 30 to accommodate and preferably correct mold misalignment. When seated, there preferably is zero clearance between the mated tapered sections 62, 64, 102, 104 to correct misalignment.

The sidewalls 94, 96 preferably are spaced apart just enough so that the rollers 68 in the head 50 of the locking device 22 will contact them and ride them during docking. In a preferred embodiment, there is zero clearance on each side between the rollers 68 and the straight section of each sidewall 94, 96. Rotation of the rollers 68 helps facilitate quick and easy closing of a mold while also helping to ensure that the one half 24 of the mold is more accurately located relative to the other half 28 of the mold. Rotation of the rollers 68 during registry of the head 50 with the receiver 26 helps reduce friction, decrease wear, and increase the life of the novel mold interlock.

Although the mold interlock 20 is shown in its seated position with a slight gap between the head 50 and bottom wall 98 (FIG. 1) and a slight gap between the ends of arms 90, 92 and the top of the base 32 of the locking device 22, the mold interlock 20 preferably is constructed such that when seated, there is abutment at least between the ends of arms 90, 92 and the top of base 32. Such an arrangement preferably prevents the buildup of bending moments on the arms 90, 92. If desired, the mold interlock 20 can also be constructed such that the end of the head 50 abuts against the bottom wall 98 of the pocket 30 of the receiver 26.

Referring to FIG. 4, the base 32 of the locking device 22 is disposed in a pocket or bore in one half 24 of the mold and the receiver 26 is disposed in a pocket or bore in the other half 28 of the mold. The head 50 of the locking device 22 projects outwardly from the base 32 beyond the top surface 106 of the mold half in which it is mounted. In the preferred embodiment shown in FIG. 4, both the locking device 22 and the receiver 26 are attached by fasteners.

Figure 5:
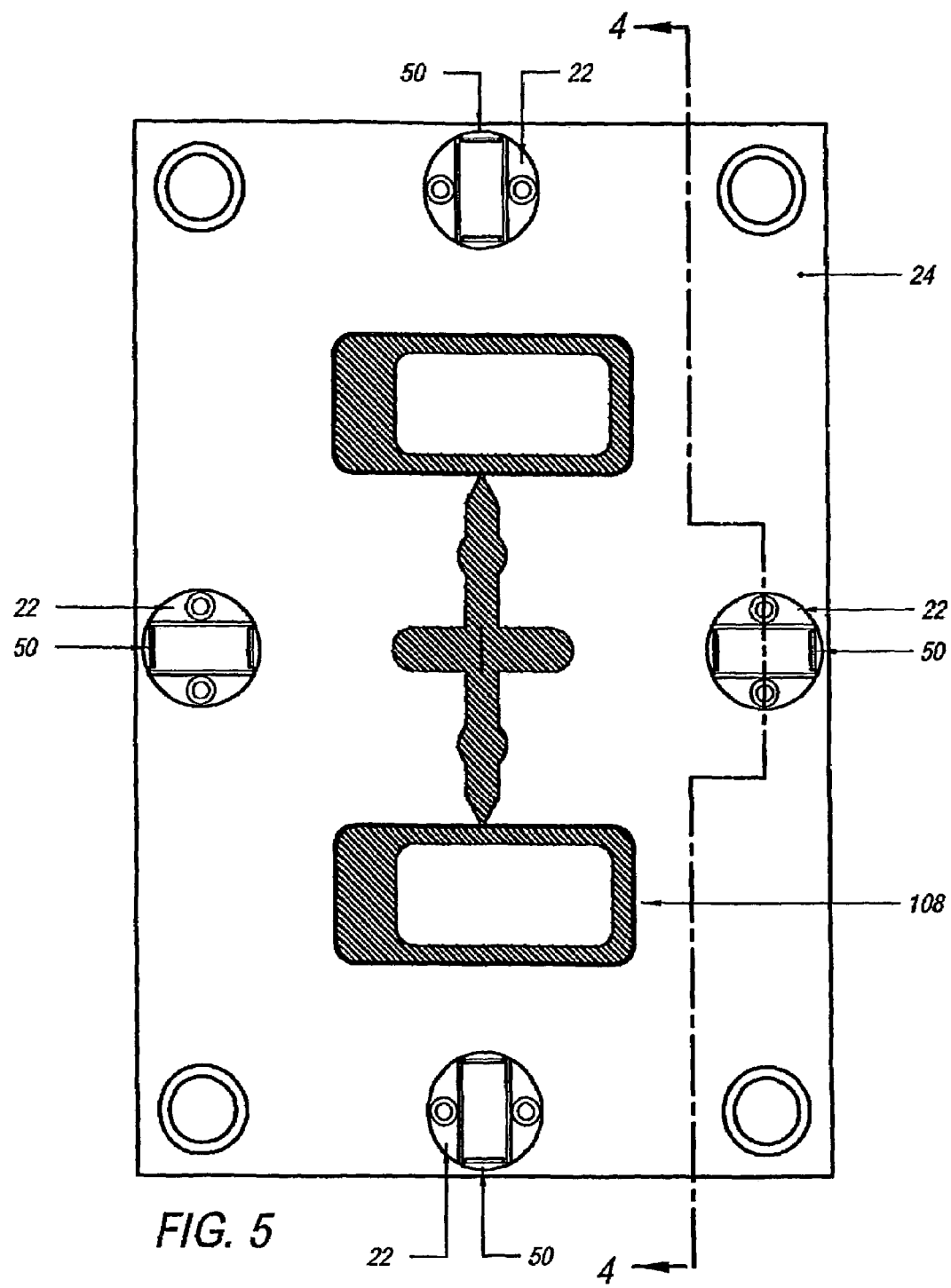
FIG. 5 is a top view of a mold half equipped with four spaced apart interlocking devices preferably disposed along parting lines of the mold.

FIG. 5 illustrates a mold half 24 with a plurality of spaced apart mold interlocks 20. In the exemplary mold shown in FIG. 5, there is a locking device 22 disposed along each side of the mold with at least one mold cavity 108 disposed between them.

Figure 6:
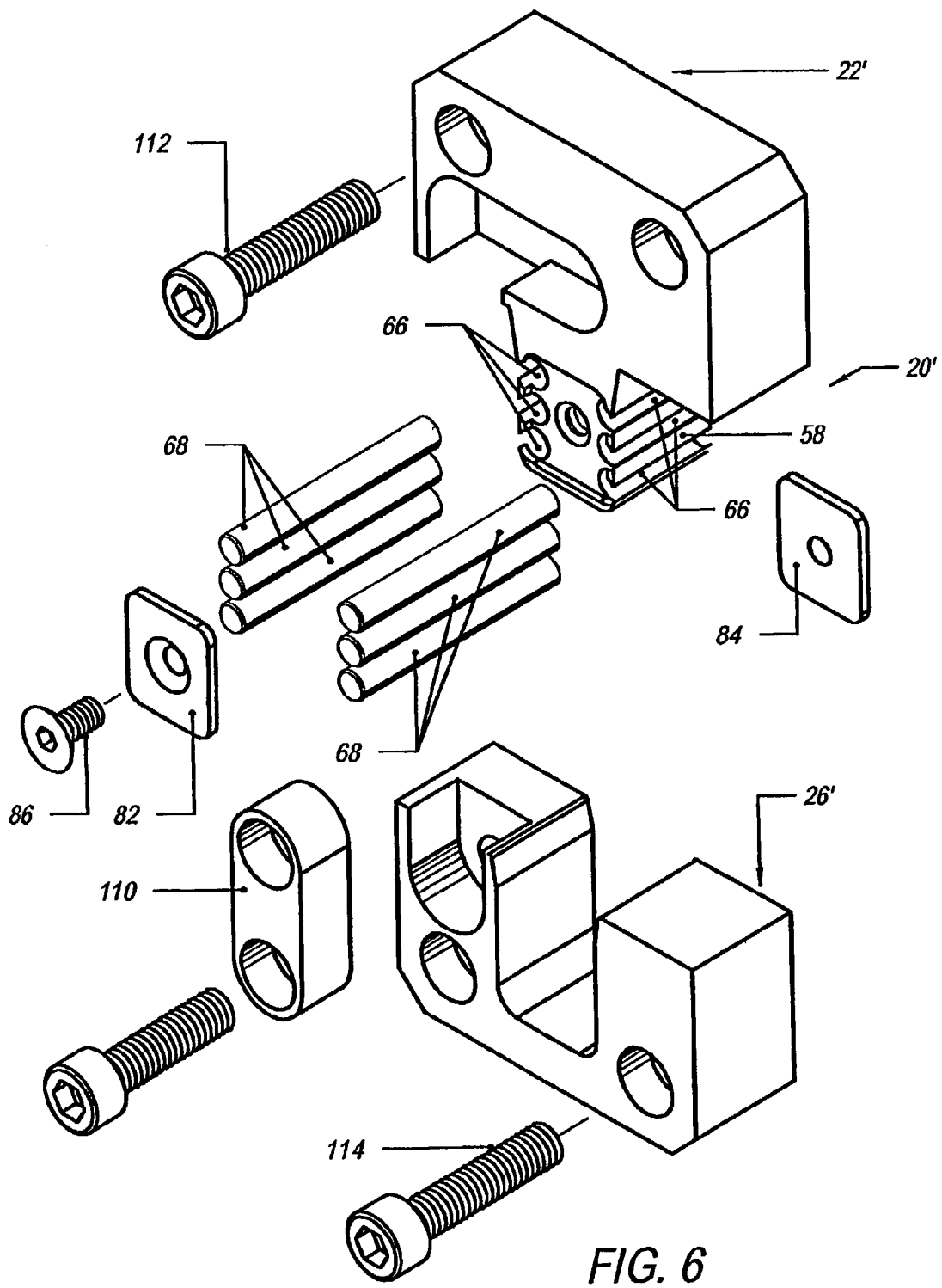
FIG. 6 is an exploded perspective view of a second preferred embodiment of an interlocking device.
Figure 7:
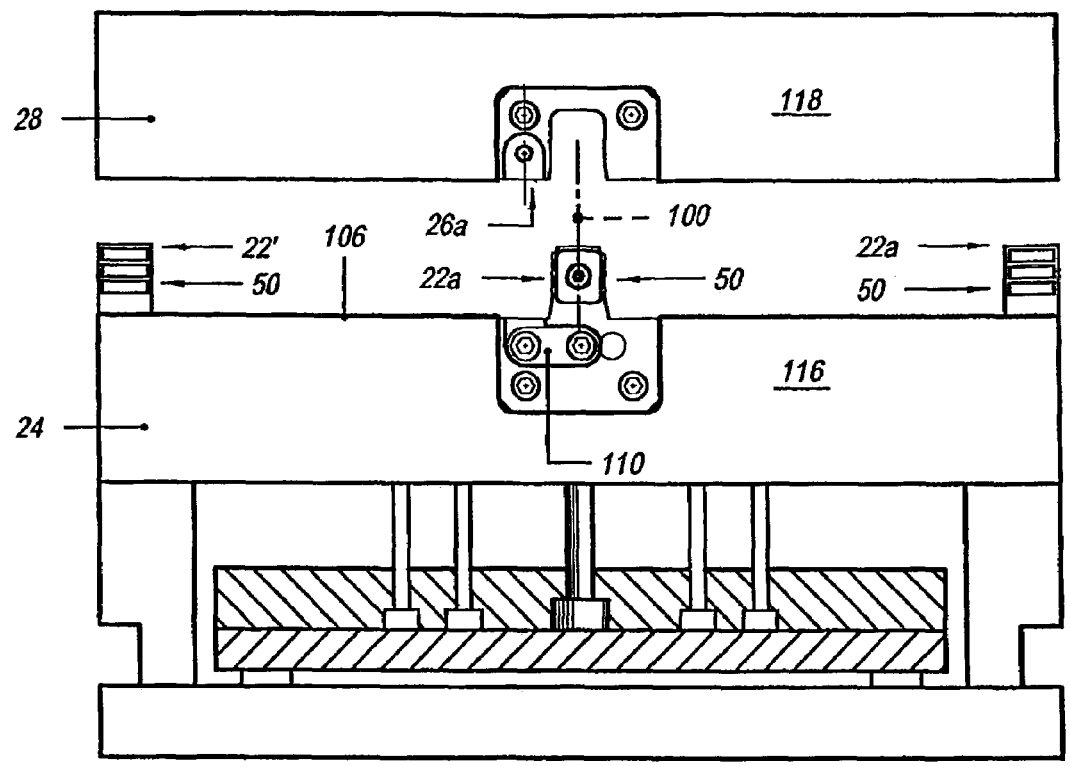
FIG. 7 is an end view of a mold with its halves separated.
Figure 8:
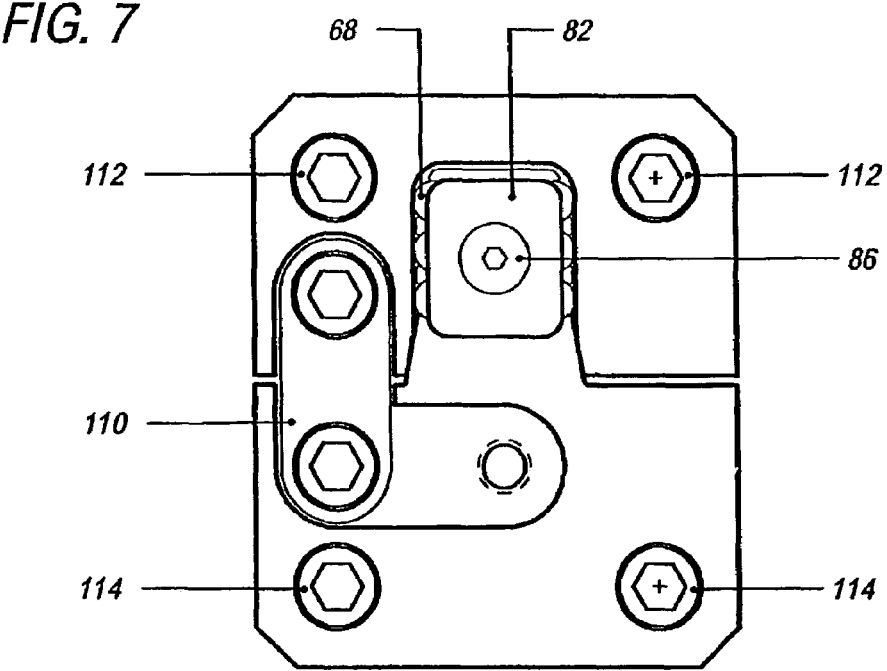
FIG. 8 is an enlarged side view of the mold interlocking device of FIG. 6 that includes a locking apparatus.

FIGS. 6–9 illustrate a second preferred embodiment of a locking device 22*a*. The locking device 22*a* shown in FIG. 6 is similar to the locking device 22 shown in FIG. 1 except that it need not be of cylindrical construction and it can accommodate a locking strap 110 that is used to keep the mold closed. Additionally, mounting of both the locking device 22*a* and the receiver 26*a* is accomplished using fasteners 112, 114 that are disposed generally perpendicular to the longitudinal axis 100 of the locking device head. Such a mounting arrangement permits both the receiver 26a and locking device 22a to be disposed in a pocket in a sidewall 116, 118 of the mold instead of in a top wall or top surface of the mold. An advantage of mold interlock device 22a is that it is configured to retrofit molds that previously used side locks.

Figure 9:
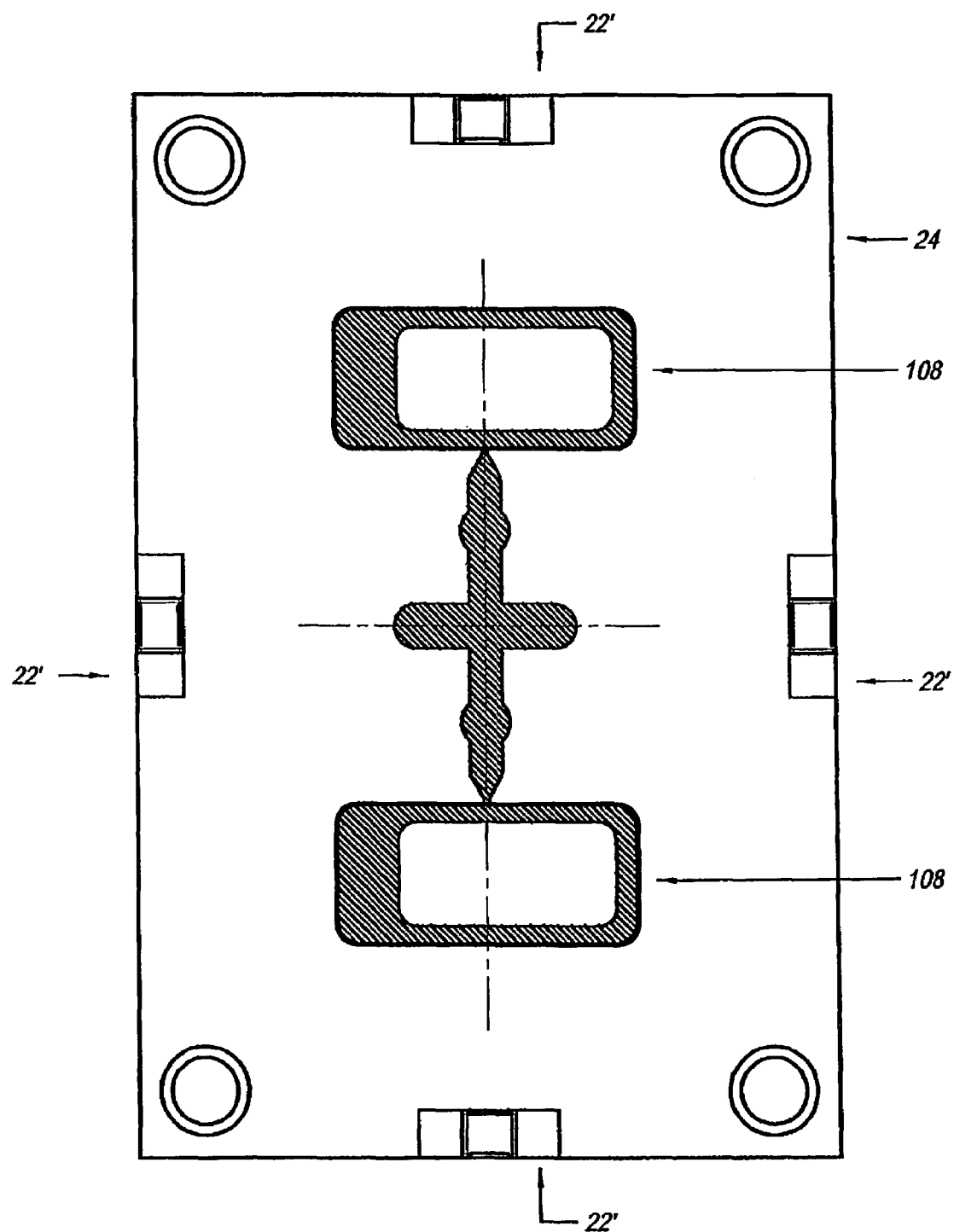
FIG. 9 is a top view of a mold half equipped with four spaced apart mold interlocks of the type shown in FIG. 6.

FIG. 9 illustrates a mold half 24 with a plurality of spaced apart locking devices 22a. In the exemplary portion of the mold shown in FIG. 9, there is a device 22a disposed along each side of the mold with at least one mold cavity 108 disposed between them. Preferably, each device 22a is disposed along a mold parting line.

Figure 10:
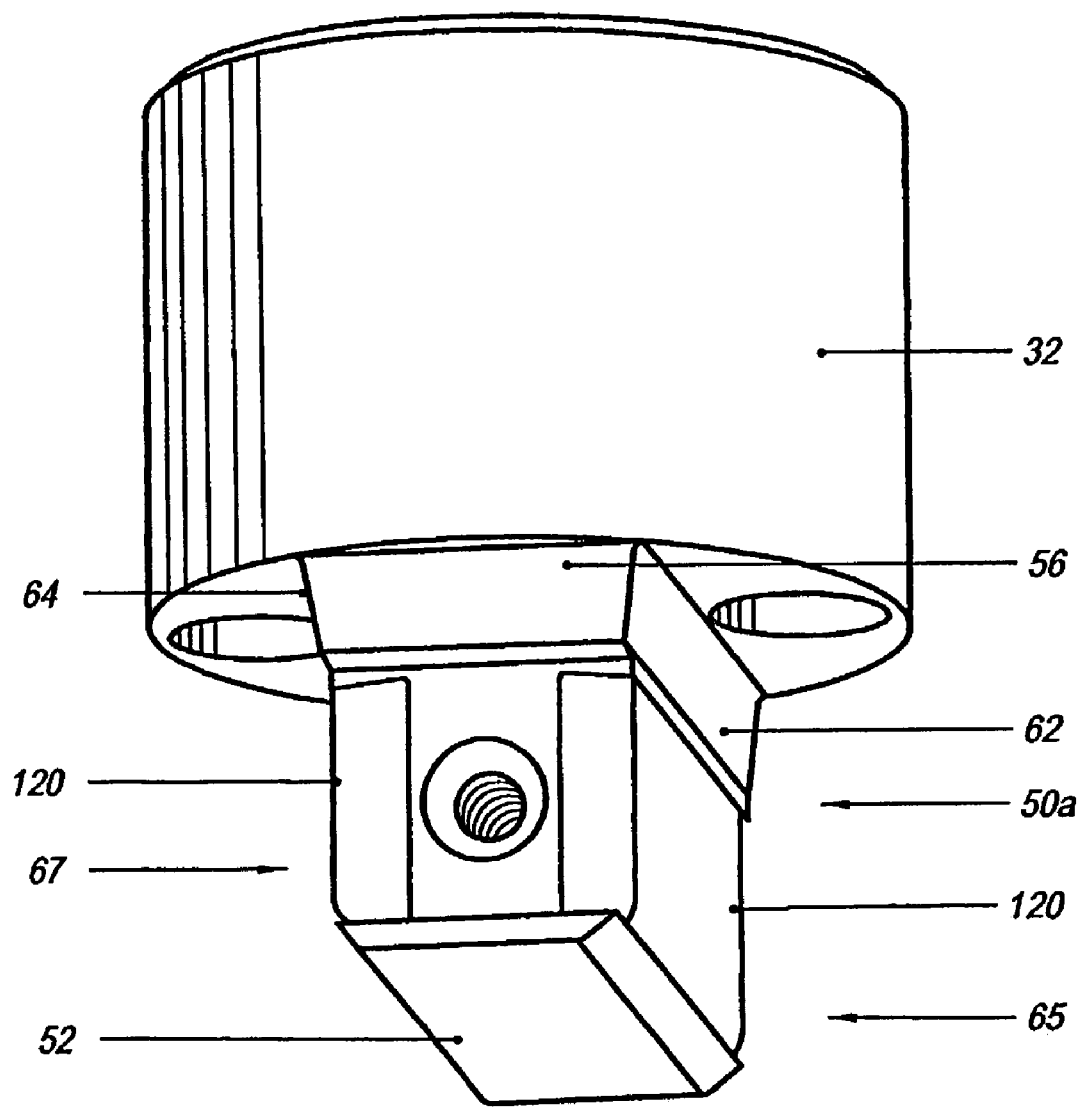
FIG. 10 is an enlarged perspective view of a head of a third preferred embodiment of a mold interlock.
Figure 11:
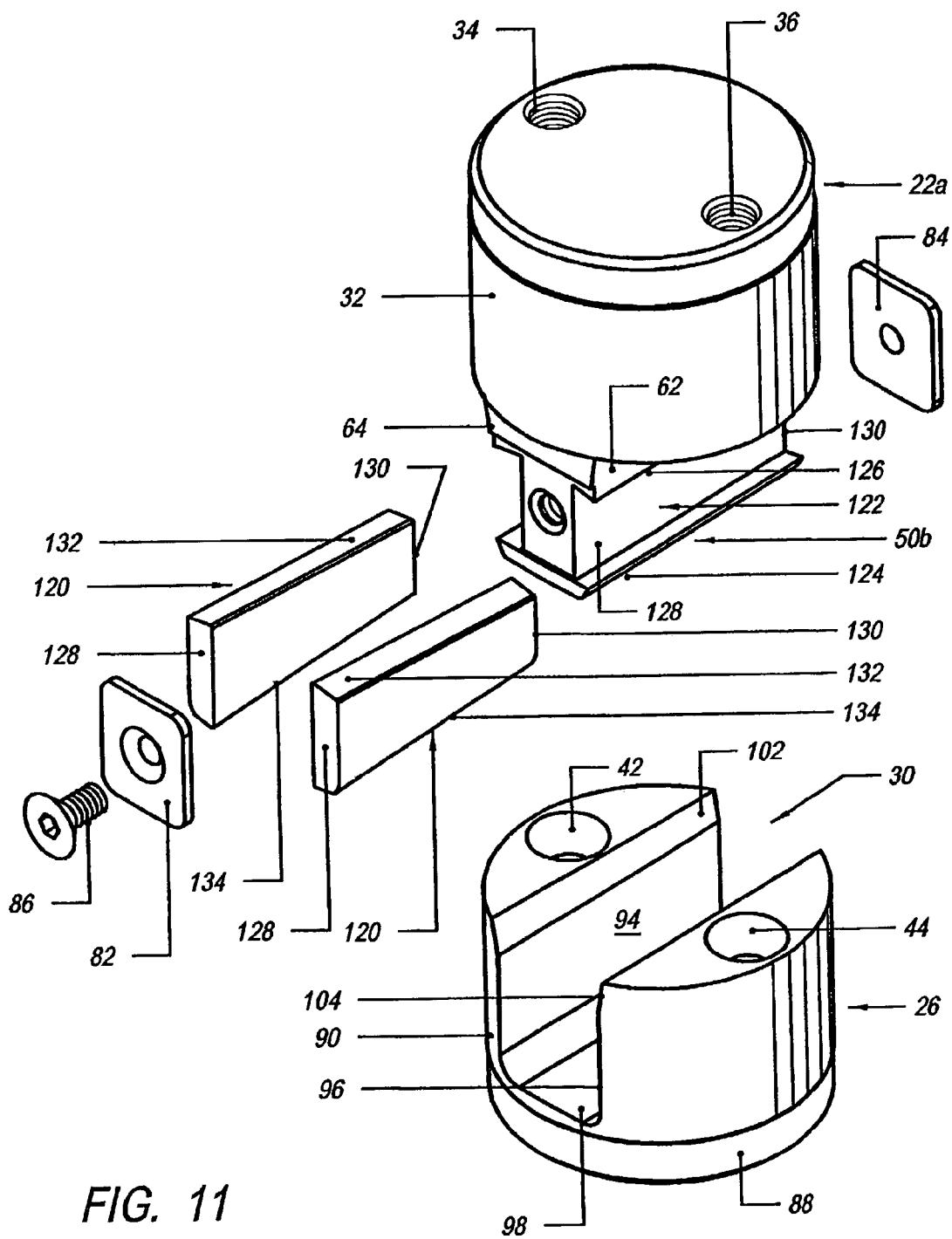
FIG. 11 is an exploded perspective view of a fourth preferred embodiment of a mold interlock.
Figure 12:
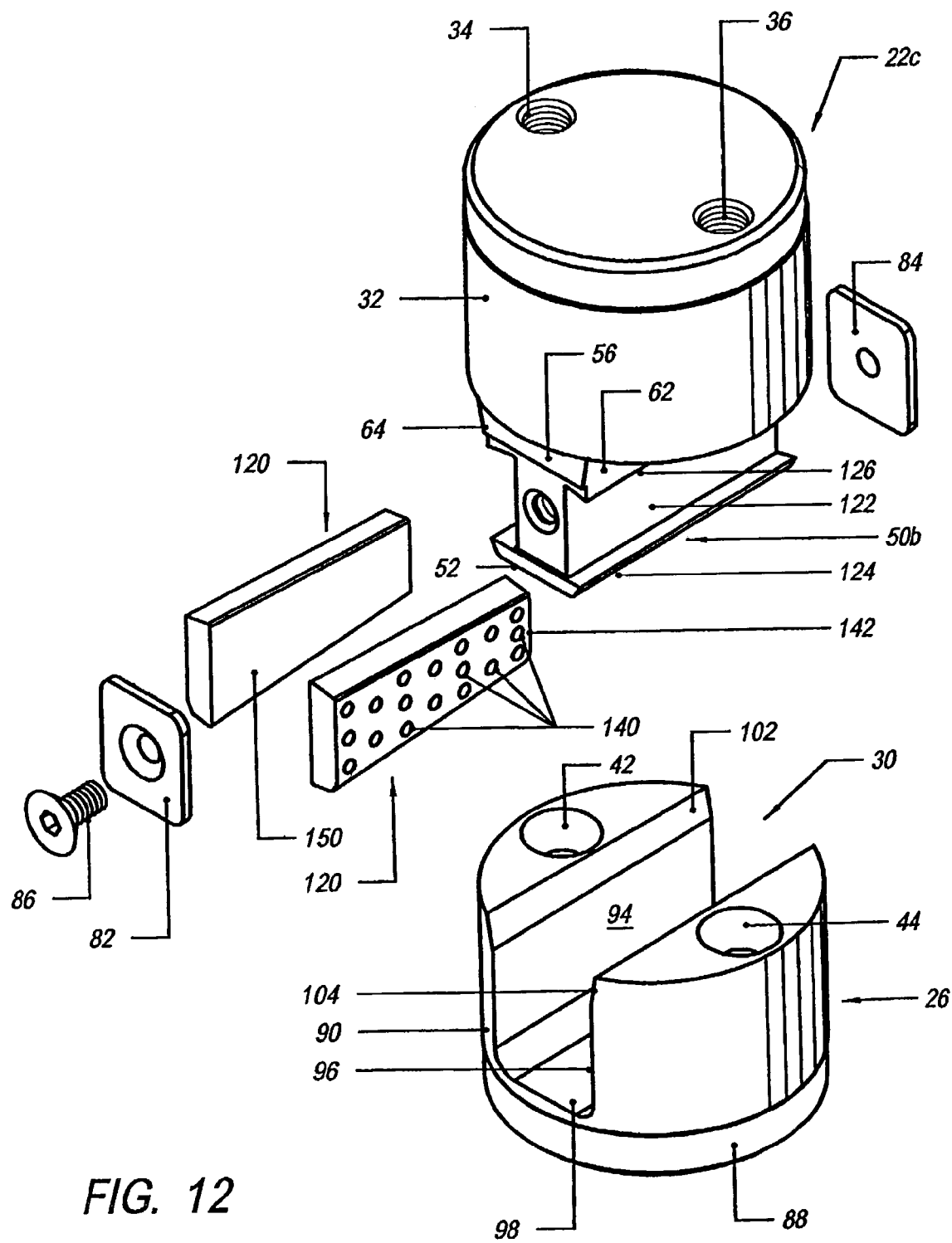
FIG. 12 is an exploded perspective view of a fifth preferred embodiment of a mold interlock.

FIGS. 10 and 11 illustrates the head 50a of another preferred embodiment of a locking device 22b. The head 50b includes a removable sacrificial insert 120 that is carried by each sidewall. The insert 120 can be made of hardened steel, but preferably is made of a material having reduced friction characteristics. For example, the insert can be made of bronze plated soft steel, bronze plated hardened steel, or bronze. Where made of bronze plated soft steel, bronze plated hardened steel, or bronze, the mold interlocking device 22b need not be lubricated.

The insert 120 shown in FIG. 11 differs from that shown in FIG. 10 in that it slightly tapers and is received in a channel 122 defined by a pair of lips 124, 126 that also taper such that the channel 122 is complementary with the insert 120. In a preferred embodiment, the taper of each lip 124, 126 of each channel 122 tapers inwardly about 2° such that one end 128 of the channel 122 is wider than the other end 130. The sidewalls 132, 134 of the insert 120 shown in FIG. 11 preferably also tapers at an angle of about 2° such that the insert 120 is wider at one end 136 than at the other end 138. As a result, the insert 120 wedges into the channel 122 in which it is insert such that it preferably will not move during operation.

FIGS. 12–16 depict another preferred embodiment of a locking device 22c. This device 22c is similar to the locking devices shown in FIGS. 10 and 11 except that the insert 120 is equipped with spaced apart plugs 140 that reduce friction. In a preferred embodiment, the plugs 140 are embedded in an outer surface 142 of each insert 122. Each plug 140 can be comprised of a solid lubricant such as graphite, carbon graphite matrix, polytetrafluoroethylene, or another type of solid lubricant. The use of such lubricant plugs 140 advantageously eliminate the use of liquid lubricant, which allows use in applications where no liquid lubricant can be used.

FIG. 13 depicts a sidewall configuration that facilitates registry of the head 50b with the receiver 26. In addition to outwardly tapered sidewall sections 62, 64, the sidewalls of the head 50b include second inwardly tapered sections 146, 148. The inwardly tapered section 146, 148 reduces the width of the head 50b adjacent its free end to provide increased clearance between the head 50b and the receiver 26. Increased clearance enables the interlock to accommodate greater misalignment between the mold halves. In a preferred embodiment, the angle of each tapered section 146, 148 is at least 15° relative to longitudinal axis 100 or the straight portion of its corresponding sidewall. Preferably, the taper angle is between 20° and 30° to rapidly take up misalignment as the head 50b is entering the pocket 30.

Still referring to FIG. 13, the straight portion of each head sidewall is disposed between the outwardly tapered portion and the inwardly tapered portion. More specifically, the straight portion of each head sidewall comprises the outer surface 142 (FIG. 12) of the insert 120. Each inwardly tapered portion 146, 148 is disposed between the free end of the head 50b and the outer surface 142 of the insert 120. Each outwardly tapered portion 62, 64 is disposed between the outer surface 142 of the insert 120 and the base 32.

Referring to FIG. 15, the insert 120 has an outer surface 140 that preferably forms the straight portion of each head sidewall. The insert 120 also includes a rear wall 150 that preferably abuts part of the head 50b when the insert 120 is received in a channel 122. The insert 120 includes a top wall 152 that is disposed at an angle of at least about 7° relative to a line perpendicular to the rear wall 150. The angle of the top wall 152 is complementary with that of top lip 126 to retain the insert 120 in the channel 122. The insert 120 further includes a bottom wall 154 that is also inclined at least about 70 relative to a line perpendicular to the rear wall 150. The angle of the bottom wall 154 is complementary with that of bottom lip 126 to retain the insert 120 in the channel 122. The insert 120 further includes a canted section 156 that forms part of the inwardly tapered section 146 or 148 when the insert 120 is received in a channel 122.

Figure 17:
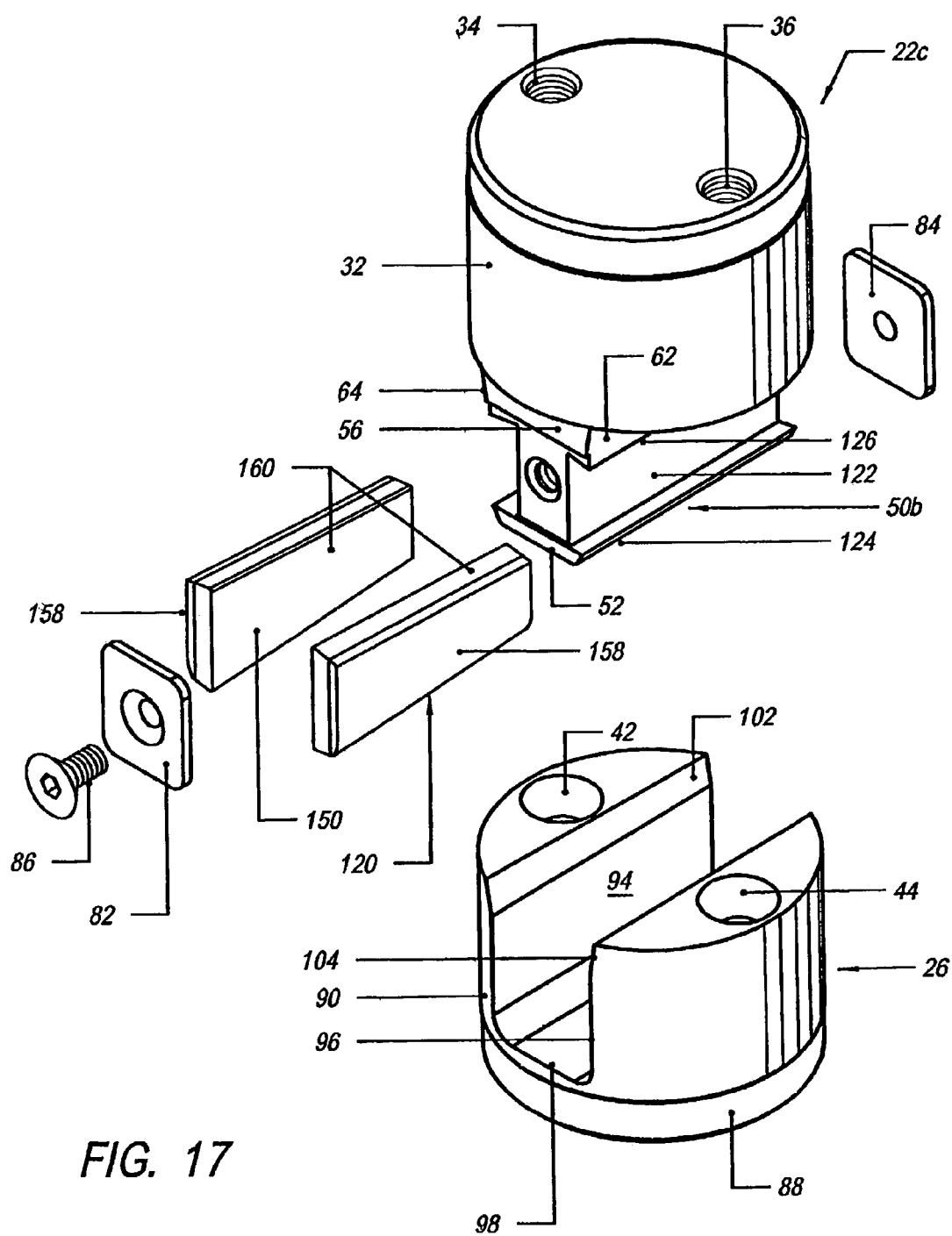
FIG. 17 is an exploded perspective view of a sixth preferred embodiment of a mold interlock.
Figure 19:
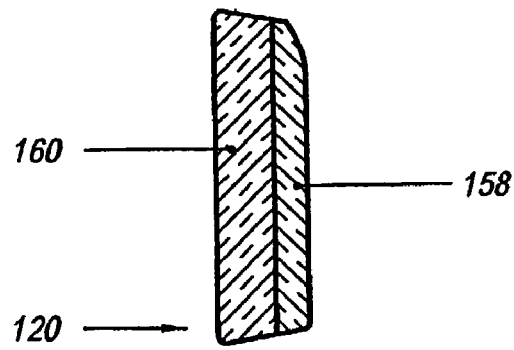
FIG. 19 is a cross sectional view of the insert of the mold interlock of FIG. 18.
Figure 18:
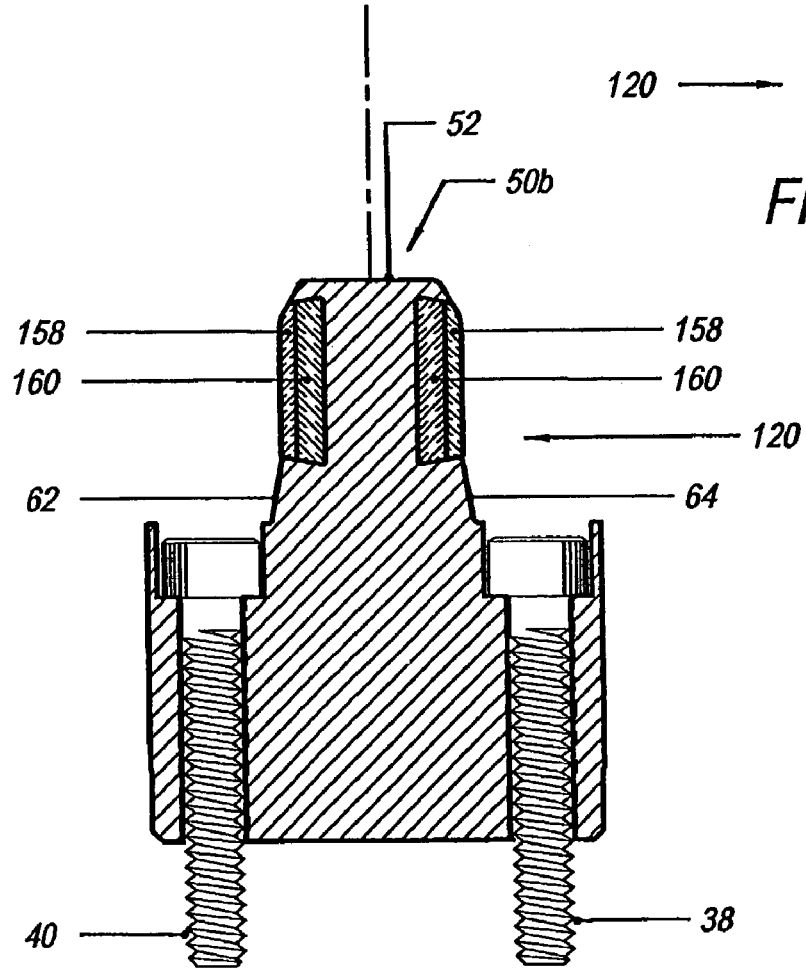
FIG. 18 is a cross sectional view of the head of the mold interlock of FIG. 17.

FIGS. 17–19 illustrate another preferred embodiment of insert 120 that is comprised of a plurality of layers and which can be of laminate construction. As is shown in FIG. 17, the outer layer 158 is comprised of a material that facilitates registry of the head 50b with the receiver 26. In one preferred embodiment, the outer layer 158 is comprised of a wear resistant material, such as a hardened steel, a tool steel, a high speed steel, or bronze. In another preferred embodiment, the outer layer 158 is comprised of a solid lubricant. In a still further preferred embodiment, the outer layer 158 comprises a coating that can be dipped, sprayed on, ion implanted, or drawn into the matrix of the underlying base 160. The base 160 preferably is made of metal, such as a steel, but can be made of another material.

The interlocking apparatus 20 advantageously helps assure positive alignment between mold halves or between plate or individual cavities and cores. During operation, the head 50 moves toward the receiver 26 until it enters the pocket 30. As it enters the pocket 30, a portion of the head 50 typically contacts a portion of the receiver 26.

Where the head 50 is equipped with roller inserts 68, a roller 68 typically contacts the receiver 26. When the roller 68 contacts the receiver 26, it contacts a sidewall 94, 96 and preferably begins rotating. Rotation facilitates further movement of the head 50 into the receiver 26 as it reduces friction therebetween. The rounded exterior 68 of the contacting roller 68 also helps facilitate smooth registry and can accommodate some slight misalignment between mold halves.

As the head 50 travels farther into the pocket 30, tapered head sidewall sections 62, 64 bear respectively against the tapered sidewall sections 104, 102 seating it in zero clearance and helping to accurately locate one mold half relative to the other mold half. Tapered sidewall section 102, 104 also serve to widen the mouth of the pocket 30 to help accommodate additional mold misalignment while also rapidly moving the mold halves toward alignment in a manner that protects smaller angle, e.g. 10 degrees or less, shut-offs.

Where the head 50 is equipped with plate inserts 120, an exterior surface of one of the plates 156 or 142 preferably makes first contact with one of the sidewalls 94 or 96. Tapered head section 146, 148 in combination with tapered section 102, 104 provide additional clearance to compensate for mold misalignment while rapidly reducing that clearance as the head 50 travels farther into the pocket 30. As the head 50 travels farther into the pocket 30, the inserts 120 on both sides are capable of making contact with sidewalls 94, 96.

As contact is made, the mold halves are brought further into alignment until tapered surfaces 62, 64 seat against tapered surfaces 102, 104 bringing the mold interlock into zero clearance alignment.

Each component of the interlocking apparatus can advantageously be economically produced using currently available production equipment, such as CNC mills, wire EDM machines, and CNC grinders and other types of machining and forming equipment. The head 50, including in particular its insert-receiving channels, is machined using a wire EDM machine or a CNC grinder.

The roller arrangement advantageously allows for less required clearance at lower friction preferably without using a liquid lubricant (or much less liquid lubricant) as compared to a conventional interlocks. This is especially advantageous for medical molding and other high precision molding applications where grease or some other lubricant is not allowed. When properly installed in a mold, heated mold halves are permitted to expand independently while still being able to maintain a precise positive alignment relative to the centerline of the mold. The round base design shown in various drawing figures is advantageously self-centering around its own axis with a simplified round bore mold installation. The final lockup of the mold occurs with a tapered zero clearance lock, which helps keep the mold halves or cores from shifting due to internal mold pressure, such as from injected plastic or another molding material.

It is also to be understood that, although the foregoing description and drawings describe and illustrate in detail one or more preferred embodiments of the present invention, to those skilled in the art to which the present invention relates, the present disclosure will suggest many modifications and constructions as well as widely differing embodiments and applications without thereby departing from the spirit and scope of the invention.

What is claimed:

1. An interlock assembly for a mold that has a plurality of mold halves comprising:
   a receiver carried by one of the mold halves that has a generally U-shaped elongate pocket open along each side with the pocket defined by a pair of generally parallel, spaced apart, generally planar, and generally rectangular sidewalls that each extends generally perpendicularly from a generally rectangular and a generally planar bottom wall disposed between the sidewalls;
   a male interlock carried by another one of the mold halves that registers with the receiver when the one of the mold halves and the another one of the mold halves are juxtaposed, the male interlock comprising a head of generally rectangular cross-section; and
   an insert comprised of a material different than that of the male interlock, the insert carried by the head of the male interlock, and the insert contacting the receiver during registry of the male interlock with the receiver when the head of the male interlock is received in the pocket in the receiver.

2. The mold interlock assembly of claim 1 wherein the insert comprises a generally rectangular sacrificial plate that is removably attached to the head of the male interlock.

3. The mold interlock assembly of claim 2 wherein the head of the male interlock comprises an elongate channel formed therein in which the sacrificial plate is received.

4. The mold interlock assembly of claim 1 wherein the receiver comprises a plurality of spaced apart arms that define the pocket therebetween in which the head of the male interlock is received when disposed in registry with the receiver.

5. The mold interlock assembly of claim 1 wherein the head has a plurality of generally parallel sidewalls that each have an insert receiving channel formed therein, wherein there is a first insert disposed in one channel in one of the sidewalls of the head and a second insert disposed in the other channel in the other one of the sidewalls, wherein each insert comprises a block of wear resistant material with there being an interference fit between each one of the inserts and the channel in which the insert is disposed.

6. The mold interlock assembly of claim 1 wherein the insert is comprised of a plurality of materials with one of the materials comprised of a solid lubricant and another one of the materials comprised of a wear-resistant sacrificial solid material.

7. The mold interlock assembly of claim 1 wherein the head comprises a channel defined by a generally planar back wall and a pair of spaced apart lips and the insert comprises a generally rectangular plate made of an inner layer of a first material and an outer layer of a second material with the plate received in the channel and frictionally retained.

8. The mold interlock assembly of claim 1 wherein the male interlock comprises a base with the head extending outwardly therefrom with the head having a pair of sidewalls spaced apart a first distance, a generally rectilinearly extending tapered section disposed between the sidewalls and the base that tapers outwardly relative to the sidewalls and spaced apart a second distance that is greater than the first distance, and the pocket of the receiver having a mouth with each sidewall that defines the pocket having a generally rectilinearly extending outwardly tapering section adjacent the mouth that each abuts a corresponding one of the tapered sections of the head when the head is received in the pocket.

9. An interlock assembly for a mold that has a plurality of mold halves comprising:
   a generally U-shaped receiver removably attached to one of the mold halves;
   a male interlock removably attached to another one of the mold halves and which has a head of generally rectangular cross section that registers with the receiver when the one of the mold halves and the another one of the mold halves are brought together in close proximity to each other, and the head of the male interlock having a straight channel defined by an outer wall and a pair of spaced apart straight side edges that each extend outwardly from the wall and that are each inclined at an angle relative to the wall; and
   a wear resistant insert comprised of a material different than the head that removably wedges into the channel with the wear resistant insert having an exteriorly exposed generally planar surface disposed toward the receiver when the head registers with the receiver.

10. The mold interlock assembly of claim 9 wherein one of the side edges comprises a lip.

11. The mold interlock assembly of claim 9 wherein the male interlock comprises a base that is larger than the head.

12. The mold interlock assembly of claim 9 wherein the wear resistant insert further comprises a plurality of pairs of plugs of a solid lubricant disposed therein.

13. The mold interlock assembly of claim 9 wherein the wear resistant insert further comprises a polygonal laminate pad that is fixed to the head.

14. An interlock assembly for a mold that has a plurality of mold halves comprising:
   a receiver carried by one of the mold halves;
   a male interlock carried by another one of the mold halves and which has a head with a pair of exterior and generally parallel sides and a generally transversely extending top wall disposed therebetween, with each one of the sides comprised of a plurality of pairs of generally parallel, spaced apart, elongate, and generally C-shaped channels disposed therein that are each generally transverse to the lengthwise extent of the head; and a rotatable insert received in each one of the plurality of elongate channels in the head that each have a portion that clears the head for contacting the receiver when the head is mating with the receiver as one of the mold halves moves into close proximity to another one of the mold halves; and wherein each rotatable insert is rotatable relative to the head.

15. The mold interlock assembly of claim 14 wherein each rotatable insert comprises an elongate and generally cylindrical bearing and each elongate channel comprises a bearing raceway.

16. The mold interlock assembly of claim 15 wherein there is a clearance space between each bearing raceway and its corresponding cylindrical bearing received therein and further comprising a lubricant received in each clearance space.

17. An interlock assembly for a mold that has a plurality of mold halves comprising:
   a generally U-shaped receiver carried by one of the mold halves;
   a male interlock carried by another one of the mold halves and which has a head with a sidewall that has a plurality of elongate and spaced apart bearing raceways formed therein and an end wall disposed at an angle to the sidewall;
   a needle bearing received in each one of the plurality of bearing raceways in the head with each needle bearing having a portion that extends outwardly of the sidewall of the head;
   wherein each bearing raceway includes an opening formed in the end wall that is located at one end of the bearing raceway through which one of the needle bearings is inserted into the bearing raceway; and
   a plate removably attached to the head that overlies the opening of each one of the bearing raceways to prevent removal of each needle bearing from its corresponding bearing raceway.

18. An interlock assembly for a mold that has a plurality of mold halves comprising:
   a receiver carried by one of the mold halves comprised of a pair of sidewalls spaced apart so as to define a pocket therebetween having a mouth with each sidewall having an outwardly tapering straight transversely extending section adjacent the mouth;
   a male interlock carried by another one of the mold halves, the male interlock comprising a base with a head extending outwardly therefrom with the head having a pair of sidewalls spaced apart a first distance, a tapered straight transversely extending section disposed between the sidewalls and the base that tapers outwardly relative to the sidewalls and spaced apart a second distance that is greater than the first distance; and
   wherein each tapering straight transversely extending section of the receiver abuts a corresponding one of the tapered straight transversely extending sections of the head when the head is received in the pocket of the receiver.

19. An interlock assembly for a mold that has a plurality of mold halves comprising:
   a first portion that includes a head with a pair of sidewalls;
   a second portion that includes a head receiving receptacle that is defined by a pair of opposed sidewalls;
   a first replaceable insert disposed between one of the pair of sidewalls of the head and one of the pair of opposed sidewalls that defines the receptacle; and
   a second replaceable insert disposed between the other one of the pair of sidewalls of the head and the other one of the pair of opposed sidewalls that defines the receptacle.

20. The mold interlock assembly of claim 19 wherein each replaceable insert is comprised of metal.

21. The mold interlock assembly of claim 19 wherein each replaceable insert has a substantially rectangular shape.

22. The mold interlock assembly of claim 19 wherein each replaceable insert comprises a sacrificial insert.

23. The mold interlock assembly of claim 19 wherein each replaceable insert has a front wear surface and a pair of side engagement surfaces.

24. The mold interlock assembly of claim 23 wherein each side engagement surface has a taper.

25. A mold interlock assembly for a mold having a plurality of mold halves comprising:
   a generally U-shaped receiver carried by one of the mold halves, the receiver having a pocket with a mouth, the pocket defined by a pair of spaced apart and generally planar sidewalls with each sidewall having an outwardly tapered, generally flat, and generally straight section disposed along an outer edge adjacent the mouth;
   a head extending outwardly from a base carried by another one of the mold halves, the head having a generally rectangular cross section and including a pair of spaced apart and generally planar sidewalls, a pair of end walls, and a generally rectangular top wall that is generally perpendicular to the sidewalls with each sidewall having an outwardly tapered, generally flat, and generally straight section adjoining the base; and
   wherein the head is received in the pocket when one of the mold halves is juxtaposed with the another one of the mold halves such that each tapered section of the head bears against a respective one of the tapered sections of the receiver.

26. A mold interlock assembly for a mold having a plurality of mold halves comprising:
   a receiver carried by one of the mold halves, the receiver having a pocket with a mouth, the pocket defined by a pair of spaced apart and opposed sidewalls with each sidewall having an outwardly tapered section extending rectilinearly along an outer edge thereof adjacent the mouth;
   a head extending outwardly from a base carried by another one of the mold halves, the head comprised of a pair of opposed sidewalls, a pair of end walls, and a generally rectangular top wall disposed between the sidewalls and the end walls with each sidewall having an outwardly tapered section extending rectilinearly along the base and an inwardly tapered section extending rectilinearly along the top wall; and
   wherein the head is received in the pocket when one of the mold halves is juxtaposed with the another one of the mold halves such that each outwardly tapered section of the head bears against a respective one of the outwardly tapered sections of the receiver.

27. The mold interlock assembly of claim 26 wherein each one of the tapered sections is generally planar.

28. A mold interlock assembly for a mold having a plurality of mold halves comprising:
- a generally U-shaped receiver carried by one of the mold halves, the receiver having a pocket with a mouth, the pocket defined by a pair of spaced apart and opposed sidewalls;
- a head extending outwardly from a base that is larger than the head and that is carried by another one of the mold halves, the head having a generally rectangular cross section and including a pair of opposed outer sidewalls, a pair of end walls, and a top wall;
- a first sacrificial replaceable plate carried by one of the sidewalls of the head that is made of a material different than that of the head and a second sacrificial replaceable plate carried by the other one of the sidewalls of the head that is made of a material different than that of the head;
- wherein the head is received in the pocket when one of the mold halves is disposed adjacent to the another one of the mold halves; and
- wherein each sidewall of the head is generally parallel to a respective one of the sidewalls of the receiver when the head is received in the pocket in the receiver.

29. A mold interlock assembly for a mold having a plurality of mold halves comprising:
- a generally U-shaped receiver removably attached to one of the mold halves, the receiver having a pocket with a mouth, the pocket defined by a pair of spaced apart and opposed sidewalls interconnected by a bottom wall;
- a head extending outwardly from a base removably attached to another one of the mold halves, the head having a generally rectangular cross section and including a pair of opposed sidewalls, a pair of end walls, and a top wall;
- wherein the head is received in the pocket when one of the mold halves is disposed adjacent the another one of the mold halves;
- a first replaceable plate having a generally flat wear surface, the first replaceable plate disposed between one of the sidewalls of the head and one of the sidewalls of the receiver when the head is received in the pocket; and
- a second replaceable plate having a generally flat wear surface, the second replaceable plate disposed between the other one of the sidewalls of the head and the other one of the sidewalls of the receiver when the head is received in the pocket.

30. A mold interlock assembly for a mold having a plurality of mold halves comprising:
- a generally U-shaped receiver removably attached to one of the mold halves, the receiver having a pocket with a mouth, the pocket defined by a pair of spaced apart and generally parallel sidewalls with a generally planar bottom wall extending between the sidewalls;
- a head extending outwardly from a base removably attached to another one of the mold halves, the head having a generally rectangular cross section and including a pair of generally parallel sidewalls, a pair of generally parallel end walls generally perpendicular to the sidewalls, and a generally planar top wall extending between the sidewalls and the end walls;
- wherein the head is received in the pocket when one of the mold halves is disposed adjacent the another one of the mold halves;
- a first replaceable plate disposed between one of the sidewalls of the head and one of the sidewalls of the receiver when the head is received in the pocket; and
- a second replaceable plate disposed between the other one of the sidewalls of the head and the other one of the sidewalls of the receiver when the head is received in the pocket.

31. A mold interlock assembly for a mold having a plurality of mold halves comprising:
- a generally U-shaped receiver removably attached to one of the mold halves, the receiver having a pocket with a mouth, the pocket defined by a pair of spaced apart and opposed sidewalls interconnected by a bottom wall with each sidewall having a straight tapered section adjacent the mouth;
- a head extending outwardly from a base removably attached to another one of the mold halves, the head having a generally rectangular cross section and including a pair of opposed sidewalls that each has a straight tapered section adjacent the base, a pair of end walls, and a top wall;
- wherein the head is received in the pocket when one of the mold halves is disposed adjacent the another one of the mold halves;
- a first replaceable plate disposed between one of the sidewalls of the head and one of the sidewalls of the receiver when the head is received in the pocket;
- a second replaceable plate disposed between the other one of the sidewalls of the head and the other one of the sidewalls of the receiver when the head is received in the pocket; and
- wherein the straight tapered section of each one of the sidewalls of the head bears against a respective one of the straight tapered sections of the receiver when the head is received in the pocket.

32. A mold interlock assembly for a mold having a plurality of mold halves comprising:
- a generally U-shaped receiver carried by one of the mold halves, the receiver having a pocket with a mouth, the pocket defined by a pair of spaced apart and opposed generally planar sidewalls with each sidewall having a rectilinearly extending outwardly tapered section adjacent an outer edge disposed along the mouth;
- a head extending outwardly from a base carried by another one of the mold halves, the head having a generally rectangular cross section and including a pair of opposed sidewalls, a pair of end walls, and a top wall disposed between the sidewalls and the end walls, with each sidewall having a rectilinearly extending outwardly tapered section adjoining the base and an inwardly tapered section adjoining the top wall;
- a first wear plate releasably attached to the head adjacent one of its sidewalls, the first wear plate having an exposed outer surface;
- a second wear plate releasably attached to the other one of the sidewalls of the head, the second wear plate having an exposed outer surface; and
- wherein the head is received in the pocket when one of the mold halves is disposed adjacent the another one of the mold halves and each outwardly tapered section of the head bears against a respective one of the outwardly tapered sections of the receiver.

33. The mold interlock assembly of claim 32 wherein each one of the tapered sections is generally planar and the exposed outer surface of each wear plate is generally planar.

34. A mold interlock assembly comprising:
- a generally U-shaped receiver having a pocket defined by a pair of spaced apart and opposed sidewalls and a bottom wall disposed between the sidewalls;

a head receivable in the pocket in the receiver, the head having a generally rectangular cross section and including a pair of spaced apart and opposed sidewalls with each one of the sidewalls generally parallel with a corresponding one of the sidewalls that define the pocket in the receiver when the head is received in the pocket in the receiver, the head having a pair of end walls and a top wall, wherein each sidewall of the head has a channel formed therein;

a first replaceable plate received in the channel in one of the sidewalls of the head, the first replaceable plate comprised of a material different than that of the head; and a second replaceable plate received in the channel in the other one of the sidewalls of the head, the second replaceable plate comprised of a material different than that of the head.

35. A mold interlock assembly comprising:

a generally U-shaped receiver having a pocket defined by a pair of spaced apart and opposed sidewalls and a bottom wall disposed between the sidewalls;

a head receivable in the pocket in the receiver, the head having a generally rectangular cross section and including a pair of spaced apart and opposed sidewalls, a pair of end walls and a top wall, wherein each sidewall of the head has a channel formed therein;

a first replaceable plate received in the channel in one of the sidewalls of the head, the first replaceable plate comprised of a plurality of layers of different materials with one of the material layers contacting one of the sidewalls of the receiver when the head is received in the pocket in the receiver; and a second replaceable plate received in the channel in the other one of the sidewalls of the head, the second replaceable plate comprised of a plurality of layers of different materials with one of the material layers contacting the other one of the sidewalls of the receiver when the head is received in the pocket in the receiver.

36. A mold interlock assembly comprising:

a generally U-shaped receiver having a pocket defined by a pair of spaced apart and opposed sidewalls and a bottom wall disposed between the sidewalls;

a head receivable in the pocket in the receiver, the head having a generally rectangular cross section and including a pair of spaced apart and opposed sidewalls, a pair of end walls and a top wall, wherein each sidewall of the head has a channel formed therein;

a first replaceable plate received in the channel in one of the sidewalls of the head, the first replaceable plate comprised of a plurality of pairs of plugs of lubricant embedded therein; and a second replaceable plate received in the channel in the other one of the sidewalls of the head, the second replaceable plate comprised of a plurality of pairs of plugs of lubricant embedded therein.

37. A mold interlock assembly comprising:

a receiver carried by one of the mold halves, the receiver having a generally U-shaped pocket defined by a pair of spaced apart and opposed sidewalls;

a head receivable in the pocket in the receiver, the head extending outwardly from a base, the head comprised of a pair of spaced apart and opposed sidewalls with each one of the sidewalls generally parallel with one of the sidewalls that define the pocket in the receiver when the head is received in the pocket in the receiver, and wherein each sidewall of the head has a channel formed therein that is defined by a pair of spaced apart outwardly extending side edges that converge toward one another such that the channel is narrower adjacent one end than adjacent its other end; and a first removable plate having a shape complementary to the channel in one of the sidewalls of the head in which it is received with the first removable plate received in the channel in one of the sidewalls and engaged by the converging side edges that define the channel; and a second removable plate having a shape complementary to the channel in the other one of the sidewalls in which it is received with the second removable plate received in the channel in the other one of the sidewalls and engaged by the converging side edges that define the channel.

38. A mold interlock assembly for a mold comprising:

a receiver having a pocket with a mouth, the pocket defined by a pair of spaced apart and opposed sidewalls;

a head receivable in the pocket, the head having a generally rectangular cross section and including a pair of opposed sidewalls, each of which is generally parallel to one of the sidewalls of the receiver when the head is received in the pocket in the receiver, and each of which has a bearing raceway formed therein that has a generally C-shaped cross section; and a generally cylindrical roller bearing received in each bearing raceway.

39. A mold interlock assembly for a mold comprising:

a receiver having a pocket with a mouth, the pocket defined by a pair of spaced apart and opposed sidewalls that each have a straight tapered section adjacent the mouth;

a head receivable in the pocket, the head extending outwardly from a larger base and being of generally rectangular cross section and including a pair of opposed sidewalls and a straight tapered section along each sidewall and the base, and wherein each sidewall has a bearing raceway formed therein that has a generally C-shaped cross section;

a generally cylindrical roller bearing received in each bearing raceway; and wherein each straight tapered section adjacent the sidewall of the head and the base bears against a corresponding straight tapered section of the receiver when the head is received in the receiver.

40. A mold interlock assembly for a mold comprising:

a receiver having a pocket with a mouth, the pocket defined by a pair of spaced apart and opposed sidewalls;

a head receivable in the pocket, the head having a generally rectangular cross section and including a pair of opposed sidewalls, a pair of end walls, and a top wall;

wherein each one of the sidewalls of the head that has a bearing raceway formed therein that is defined by a curved inner surface that has a pair of lips located at an outer edge thereof and a flat disposed between the lips defining a pair of lubricant reservoirs with one of the lubricant reservoirs disposed between one of the lips and the flat and the other one of the lubricant reservoirs disposed between the other one of the lips and the flat; and a generally cylindrical roller bearing received in each bearing raceway.

* * * * *